United States Patent
Xavier da Silveira

(10) Patent No.: US 7,411,872 B1
(45) Date of Patent: Aug. 12, 2008

(54) SERVO-TRACKING AND THREE-DIMENSIONAL ALIGNMENT IN PAGE-BASED DATA OPTICAL STORAGE

(75) Inventor: Paulo E. Xavier da Silveira, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 658 days.

(21) Appl. No.: 11/027,508

(22) Filed: Dec. 30, 2004

(51) Int. Cl.
*G11B 7/00* (2006.01)

(52) U.S. Cl. ............... 369/44.11; 369/44.41; 369/103; 369/53.1

(58) Field of Classification Search ............... None
See application file for complete search history.

(56) References Cited

U.S. PATENT DOCUMENTS

| | | | |
|---|---|---|---|
| 6,552,829 B1 * | 4/2003 | Maciey et al. ............... | 358/509 |
| 2002/0172131 A1 * | 11/2002 | Burr ........................... | 369/103 |

OTHER PUBLICATIONS

Geoffrey W. Burr, *Holographic Storage*, Encyclopedia of Optical Engineering, Marcel Dekker, Inc., 2003.
Geoffrey W. Burr, et al. *Modulation Coding For Pixel-Matched Holographic Data Storage*, Optical Letters, vol. 22, No. 9, Optical Society of America, 1997.
Kurt W. Getreuer, *Optical Disk Drives—Mechanical Design And Servo Systems*, Encyclopedia of Optical Engineering, Marcel Dekker, Inc., 2003.
Jean Schleipen, et al., *Optical Heads*, Encyclopedia of Optical Engineering, Marcel Dekker, Inc., 2003.
Nicholas Blanc, *CCD versus CMOS—has CCD imaging come to an end?*, Photogrammetric Week '01', D. Fritsch and R. Spiller Eds. Wichmann Verlag, Heidelberg, 2001.
H. Zhang et al., "Multi-layer Optical Data Storage Based On Two-photon Recordable Fluorescent Disk Media," *Proc. of IEEE 18th Symposium on Mass Storage Systems and Technologies*, pp. 225-236, San Diego, 2001.
Paulo E. X. Silveira, *Optoelectronic Signal Processing Using Finite Impulse Response Neural Networks*, Ph.D. dissertaton, University of Colorado, 2001.
Simon Haykin, *Digital Communications*, John Wiley & Sons, 1988, pp. 567-588.

\* cited by examiner

*Primary Examiner*—Muhammad Edun
(74) *Attorney, Agent, or Firm*—Brooks Kushman P.C.

(57) ABSTRACT

A system for page-based optical data storage includes a sensor array positioned to track a data page when the data page is optically read from or recorded to a storage medium. A servo mechanism is used to position the sensor array. A plurality of alignment points are defined relative to the photodetector pixel array. An alignment arrangement is located at each alignment point. The sensor array further includes servo-feedback signal generation logic operative to drive the servo mechanism based on error signals from the alignment arrangements, thereby aligning the two-dimensional photodetector array with respect to the two-dimensional data page.

25 Claims, 4 Drawing Sheets

SERVO-TRACKING AND THREE-DIMENSIONAL ALIGNMENT IN PAGE-BASED DATA OPTICAL STORAGE

BACKGROUND OF THE INVENTION

1. Field of the Invention

The invention relates to page-based optical data storage. The invention further relates to optical head servo-tracking in page-based optical data storage applications.

2. Background Art

In page-based optical data storage, a page of data is recorded by storing an optically modulated page of data onto the active recording area of an optically sensitive medium. The page is then read by optically interrogating the medium, producing an optically modulated two-dimensional data page that conveys the information that was previously recorded. Detection is performed by imaging the two-dimensional data page onto the two-dimensional active pixel photodetector area of a sensor array. The detector detects the image, and the image is subsequently processed to decode the data. One example of page-based optical data storage is holographic data storage (HDS), where information is recorded as holographic gratings in the optic medium.

As in other optical data storage technologies [for example, compact disks (CD) and digital versatile disks (DVD)], page-based optical data storage also requires the tracking of focus, radial shifts and longitudinal shifts of the media with respect to the read/write optical head. Moreover, the two-dimensional pages are also sensitive to rotations of the two-dimensional page, especially to rotations about the axis perpendicular to the page (azimuthal tracking).

Background information may be found in Geoffrey W. Burr, *Holographic Storage*, Encyclopedia of Optical Engineering, Marcel Dekker, Inc., 2003; H. Zhang et al., "Multilayer Optical Data Storage Based on Two-photon Recordable Fluorescent Disk Media," *Proc. of IEEE 18th Symposium on Mass Storage Systems and Technologies*, pp. 225-236, San Diego, 2001; Kurt W. Getreuer, *Optical Disk Drives—Mechanical Design And Servo Systems*, Encyclopedia Of Optical Engineering, Marcel Dekker, Inc., 2003; and Jean Schleipen et al., *Optical Heads*, Encyclopedia Of Optical Engineering, Marcel Dekker, Inc., 2003.

Page-based optical data storage technologies and, in particular, HDS, have benefitted greatly from the recent development of low cost CMOS active pixel sensors (APS), such as the ones available today in high resolution digital cameras. These sensors, compared to traditional charge-coupled device detectors, present the advantages of lower unit cost (due to the simpler design and manufacturing) and design flexibility provided by the CMOS process, allowing more functionality to be included in the detector chip. However, these sensors have invariably been optimized for imaging applications, not for data storage.

For the foregoing reasons, there is a need for an improved sensor for page-based optical data storage.

SUMMARY OF THE INVENTION

An object of the invention is to provide an improved system for page-based optical data storage, including a sensor array optimized for servo-tracking in page-based optical data storage.

The invention comprehends a system for page-based optical data storage. A sensor array is positioned to receive a data page when the data page is optically read from the storage medium, and preferably is in the form of a CMOS active pixel sensor array.

According to the invention, the sensor array is improved in that it is optimized for servo-tracking in page-based optical data storage applications. The invention involves the defining of multiple alignment arrangements for the correct three-dimensional alignment between the data page and the sensor array. The sensor array and the spatial light modulator (SLM) used for modulating the data page during recording can be aligned pixel by pixel with the aid of a beam-splitter and combined in a single read/write optical head, as commonly done with the laser and photodetector in CD and DVD read/write capable drives. In this case, the improved tracking provided by the invention benefits the page-based alignment required by both the recording process and the readout process.

The two-dimensional pages have to be correctly aligned in three-dimensional space with respect to the two-dimensional detector array, meaning that, aside from pixel pitch variations, a maximum of six degrees of freedom must be tracked. These can be sub-divided into three translational shifts (e.g., focus shifts, radial shifts and longitudinal shifts, in a disk based optical storage medium) and three angular shifts, each one representing a rotation about one of the translation axes. However, depending on the application, not all six degrees of freedom need to be tracked, since some of them can be considered accurate by design. For example, in disk based optical data storage it can be expected that the alignment would be more sensitive to rotation about the axis perpendicular to the medium (azimuthal tracking) than to rotation about the other two axes.

The multiple alignment arrangements comprehended by the invention are utilized to provide correct three-dimensional page alignment, resulting in an improved sensor array and an improved system for page-based optical data storage. According to the invention, at least three alignment arrangements are required for correct page alignment, since at least three non-collinear points are required in order to align a plane with respect to another. However, more than three points may be used for greater alignment accuracy and/or simplicity in the estimation of the alignment error.

In a preferred embodiment of the invention, a sensor array includes four alignment arrangements added for tracking. Three tracking signals are derived from each of the four alignment arrangements. The processing of the twelve signals resulting from the four arrangements provides four servo-feedback signals (focus, tangential, radial and azimuthal tracking) required to align the photodetector sensor array to the data page.

In a more general sense, the invention comprehends a sensor array optimized for servo-tracking in page-based optical data storage, and a system employing an optimized sensor array. According to the invention, in one aspect, a sensor array includes a plurality of defined alignment arrangements for correct page alignment and means for detecting signals at these points. The number of alignment arrangements may vary depending on the application. Further, the means employed for detecting signals at those points may vary depending on the application. In addition, the location of the alignment arrangements may vary depending on the application. Each alignment arrangement produces a plurality of tracking signals which are processed in order to generate another plurality of servo-feedback signals.

It should also be appreciated that the simpler case of line-based data storage is also covered by the present invention. In line-based optical data storage the pixels of the photodetector array are placed along a line instead of a plane. In this case, up to three axes of translation must be tracked (e.g., focus shifts, radial shifts and longitudinal shifts), but only up to two rotation axes need to be tracked (the two rotation axes perpendicular to the line). For this purpose, a minimum of two alignment arrangements is required.

The alignment points are defined as the physical location of the alignment arrangements in the sensor array. According to the invention, the number of alignment points and the locations thereof are selected such that information obtained from sensing at these points is sufficient to determine the error signals used to drive the servo mechanism(s) (e.g., the servo-feedback signals) and correctly align the page. In this way, the invention involves the implementation of the concept of using at least three designated alignment points having known characteristics strategically placed such that alignment of the page is possible by controlling the servo mechanism(s) based on error signals derived from the signals sensed by a combination of the alignment arrangements.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
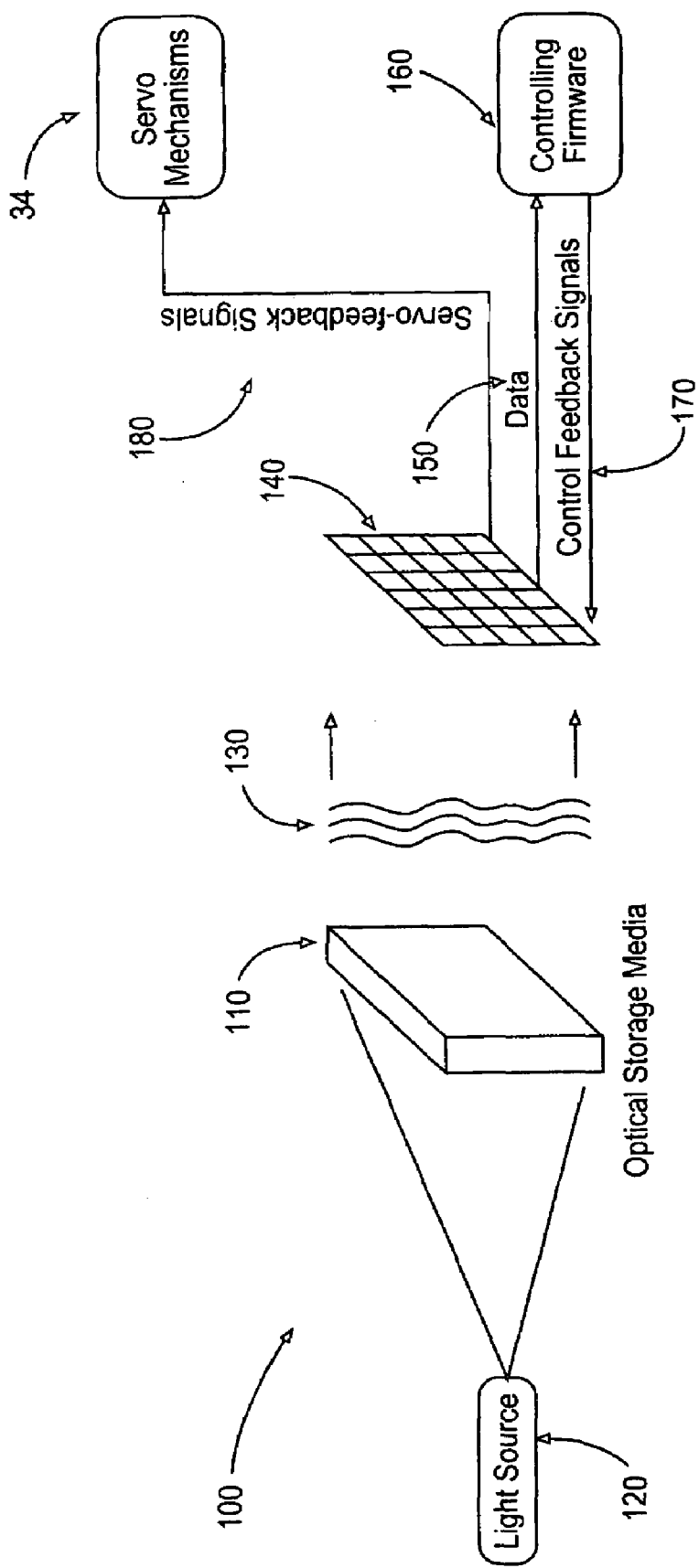
FIG. 1 depicts the readout operation in a page-based optical data storage system made in accordance with the invention.

FIG. 1 depicts the readout operation of a generic page-based optical data storage system 100 (e.g., implemented holographically, diffractively, using optical fluorescence, etc). Optical medium 110 is illuminated by light source 120, providing a plane 130 of optically modulated signals representing the stored data. The modulated signals are detected by the photodetector array 140, which is optimized for three-dimensional alignment in page-based optical data storage. From the photodetector array, the decoded data 150 is transferred out to the controlling firmware 160. Servo-feedback signals 180 are also transferred out to servo mechanisms 34 for alignment correction of the read/write head (not specifically shown) with respect to the storage medium 110. The controlling firmware also transmits control feedback signals 170 to the photodetector array, directing it on how to adjust its optical detection and error correction parameters. The details of the operation of the page-based optical data storage system are readily understood by one of ordinary skill in the art. FIG. 1 illustrates page-based data readout in general. It is appreciated that the invention may be implemented in other ways differing from that shown in FIG. 1.

According to the invention, the sensor array is optimized for servo-tracking in page-based optical data storage. The sensor array is positioned to receive a data page when the data page is optically read from the storage medium. The sensor array is preferably in the form of a CMOS active pixel sensor array.

Figure 2:
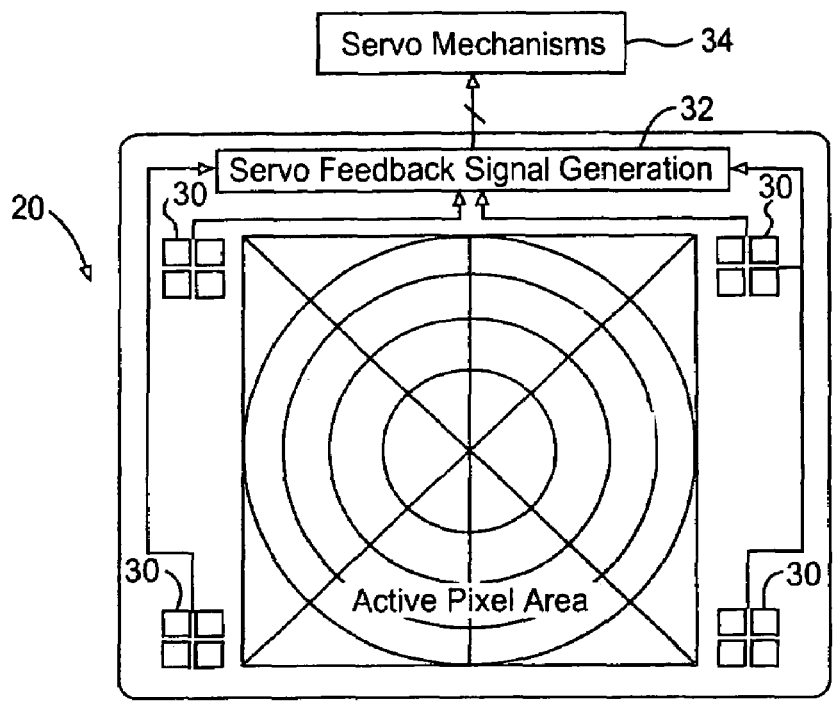
FIG. 2 is a block diagram of a page-based sensor array optimized for servo-tracking, showing the photodetector array, servo-feedback signal generation, and servo mechanisms.

With reference to FIGS. 1-2, the preferred embodiment of the invention involves the defining of multiple alignment arrangements non-collinearly placed for correct data page alignment. Taking the example of a spinning optical disk as the medium, focus shifts, radial shifts and longitudinal shifts have to be tracked. In addition, azimuthal tracking is also employed as these two-dimensional pages are also sensitive to rotation about the axis perpendicular to the medium, and it is assumed that the storage system is not very sensitive to the other two axes of rotation, for a total of four servo-feedback error signals.

Figure 3:
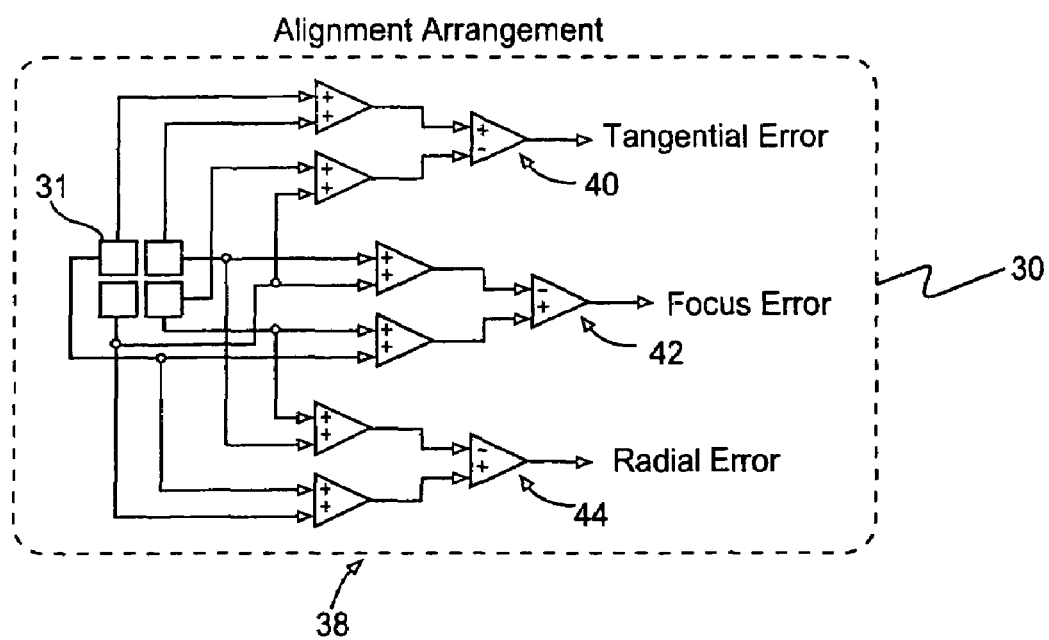
FIG. 3 illustrates one of the alignment arrangements and the error signal generation.

At least three alignment points are required for correct page alignment. As best shown in FIG. 2, the sensor array 20 includes four alignment arrangements 30 for tracking, As best shown in FIG. 3, each alignment arrangement 30 is composed of a combination of photosensors 31 and signal processing circuitry 38. Using translation error tracking techniques commonly used by CD and DVD storage devices, each alignment arrangement 30 is capable of producing three translation error signals (e.g., tangential error 40, focus error 42 and radial error 44). FIG. 3 exemplifies the use of the astigmatic focus tracking method for error tracking, as known to those of ordinary skill in the art.

Using the translation tracking errors provided by each alignment arrangement 30 and knowing their relative position to each other, the servo-feedback signal generation circuit 32 is capable of calculating a best estimate of the translation and rotation error between the photodetector array and the data page. These signals are then used to drive the servo mechanisms 34.

It is appreciated that the number of alignment points may vary depending on the application. Further, the means employed for detecting signals at these points may vary depending on the application. In addition, the location of the alignment points may vary depending on the application. The number of alignment points and locations thereof are selected such that information obtained from sensing at these points is sufficient to determine error signals to drive the servo mechanism(s) and correctly align the page.

Figure 4:
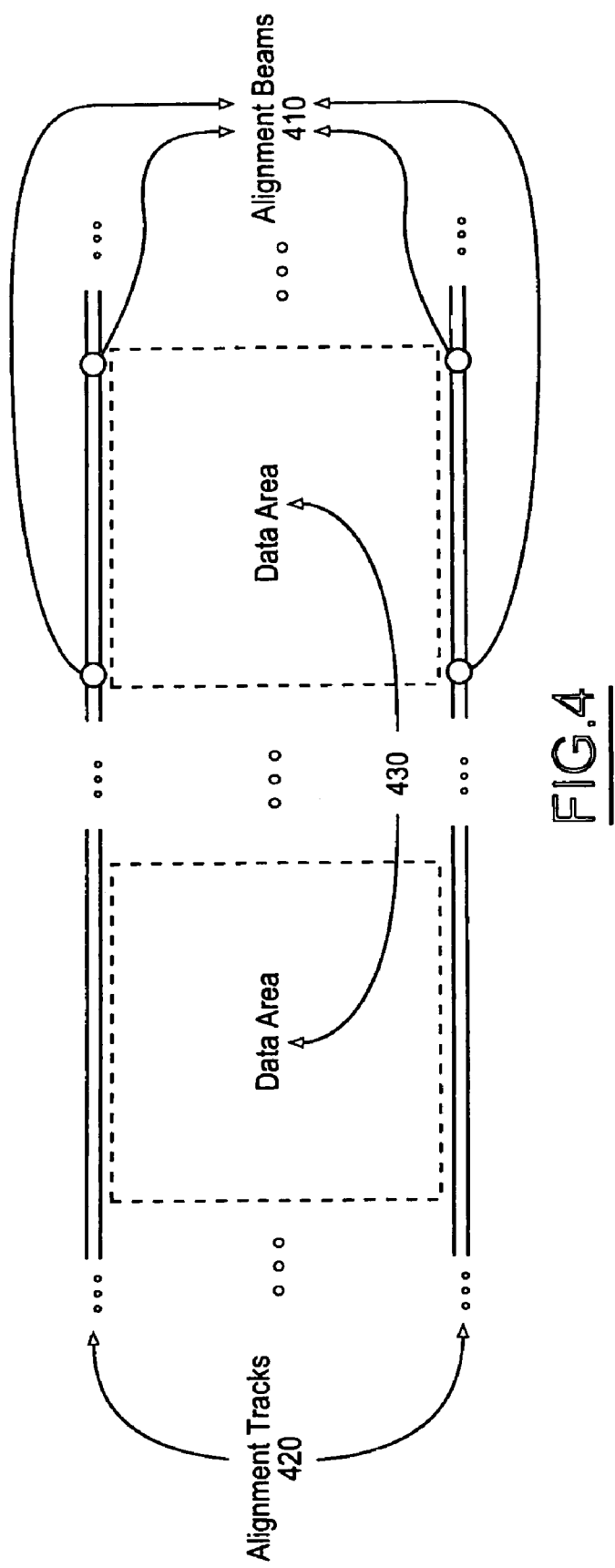
FIG. 4 illustrates the geometrical distribution of alignment tracks and data areas in an optical medium made in accordance with the invention.

In the illustrated embodiment, a diffractive optical element can be used to split a single laser alignment beam into four beams of similar power. This provides four alignment spots, ideally equidistant from the center of the data page location of the media, which preferably are not overlapping with the data page. With reference to FIG. 4, the four alignment beams 410 are shown incident upon alignment tracks 420 placed around data areas 430. The alignment tracks are shown as circular sections of a spinning-disk based optical medium (the tracks look like straight lines because FIG. 4 depicts a small section of the disk, much smaller than the disk radius at that track). The tracks are used to guide the read/write optical head with respect to the data area, thus providing the alignment arrangements 30 with the servo signals used to indicate the three translation error signals (e.g., tangential error 40, focus error 42 and radial error 44) using techniques known to those of skill in the art. Using the invention, the optical head can be aligned with respect to the data area for any operation that requires this alignment (e.g., read, write, search, verification, etc.).

Figure 5:
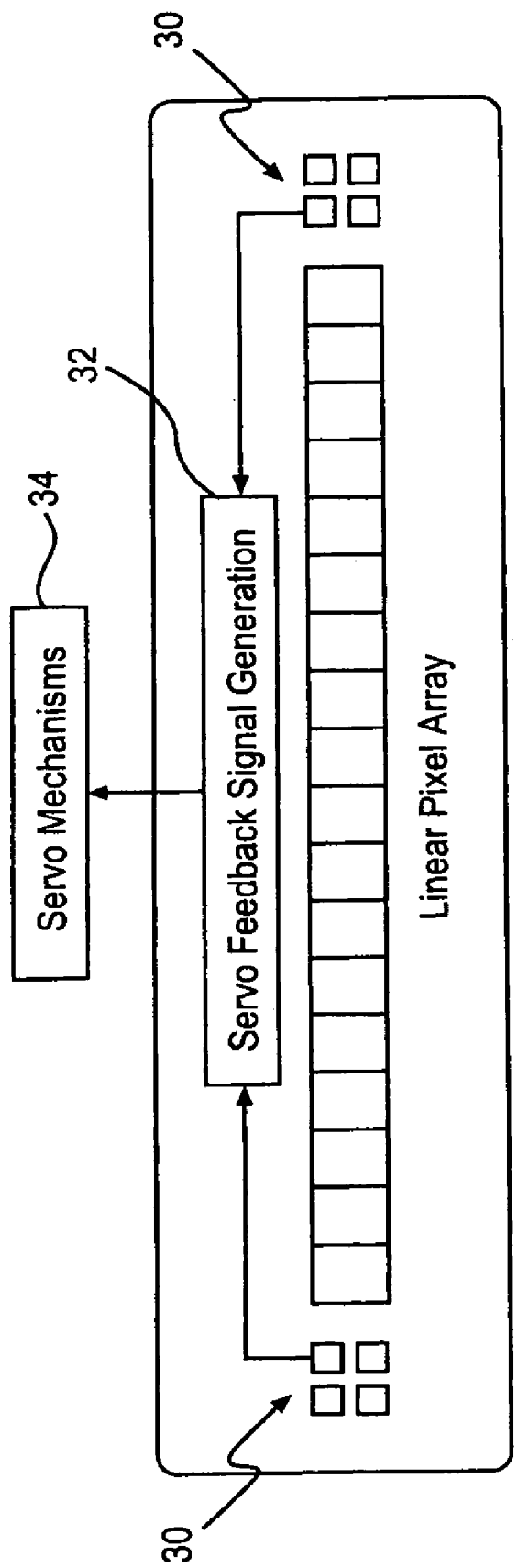
FIG. 5 is a block diagram depicting the use of the invention applied to a linear detector array.

With reference to FIG. 5, FIG. 5 shows how the invention can be applied to the simpler case of a linear photodetector array. In this case, two alignment arrangements 30 are sufficient to align the photodetector array with respect to the line of data points. Preferably, they are placed along the extremes of the array and out of the data area. Analogously, only two tracking beams are incident on the alignment tracks of the medium, and the linear pixel array scans the medium radially. This example is intended to generalize the invention and should not be interpreted as a limitation.

As alluded to above, with the number of alignment spots selected and the locations determined and the means for detecting the signals determined, any suitable method may be utilized to provide the servo control.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for page-based optical data storage, the system comprising:
    a storage medium;
    a servo mechanism;
    a sensor array positioned to detect a data page when the data page is optically read from the storage medium, the sensor array including a photodetector pixel array;
    wherein a plurality of alignment points are defined relative to the photodetector pixel array, the sensor array further including an alignment arrangement located at each alignment point; and
    a servo-feedback signal generation unit operative to drive the servo mechanism based on error signals from the alignment arrangements, thereby aligning the photodetector array with respect to the data page.

2. The system of claim 1 wherein the servo-feedback signal generation unit is implemented within the same processing unit of the sensor array.

3. The system of claim 1 wherein the plurality of alignment points includes at least three alignment points.

4. The system of claim 3 wherein the plurality of alignment points includes four alignment points.

5. The system of claim 1 wherein the sensor array is attached to an optical head and the head is used to perform an operation that includes the readout or recording of data.

6. The system of claim 1, wherein the page-based optical data storage system is implemented using at least one of the following:
    holographic data storage;
    an array of fluorescent sites;
    diffraction from a plurality of pits or grooves; and
    a plurality of photons emitted, reflected or refracted from a plurality of optical media.

7. The system of claim 1 wherein the sensor array is a CMOS active pixel sensor array.

8. The system of claim 1 wherein an alignment arrangement comprises:
    a plurality of photodetectors, wherein various combinations of the signals from the photodetectors are evaluated to determine a plurality of error signals for that particular alignment arrangement.

9. The system of claim 8 wherein the servo-feedback signal generation logic uses the error signals produced by each alignment arrangement, along with knowledge of the position of each alignment arrangement with respect to the others in order to generate a plurality of error tracking signals.

10. The system of claim 8 wherein the plurality of alignment arrangements includes four alignment arrangements placed close to the outer edge of the active pixel array.

11. For use in a system for page-based optical data storage including a storage medium, a sensor array positioned to receive a data page when the data page is optically read from the storage medium, the sensor array comprising:
    a photodetector pixel array; and
    a plurality of alignment points defined relative to the photodetector pixel array, including an alignment arrangement located at each alignment point.

12. The sensor array of claim 11 further comprising:
    servo-feedback signal generation logic operative to drive a servo mechanism based on error signals from the alignment arrangements, thereby aligning the photodetector array with respect to the data page.

13. The sensor of claim 11 wherein the plurality of alignment points includes at least three alignment points.

14. The sensor of claim 13 wherein the plurality of alignment points includes four alignment points.

15. The sensor of claim 13 wherein the alignment points are placed close to the outer edges of the photodetector pixel array.

16. The sensor of claim 11 wherein the sensor array is attached to an optical head and the head is used to perform an operation that includes the readout or recording of data.

17. The sensor of claim 11 wherein the sensor array is a CMOS active pixel sensor array.

18. The sensor of claim 11 wherein an alignment arrangement comprises:
    a plurality of photodetectors; and
    logic circuitry capable of converting a plurality of signals from the photodetectors into a plurality of error signals for that particular alignment arrangement.

19. The system of claim 18 wherein the servo-feedback signal generation logic uses the error signals produced by each alignment arrangement, along with knowledge of the position of each alignment arrangement with respect to the others in order to generate a plurality of error tracking signals.

20. A system for page-based optical data storage, the system comprising:
    a storage medium;
    a servo mechanism;
    a sensor array positioned to detect a data page when the data page is optically read from the storage medium, the sensor array including a photodetector pixel array;
    wherein a plurality of alignment points are defined relative to the photodetector pixel array, the sensor array further including an alignment arrangement located at each alignment point;
    a servo-feedback signal generation unit operative to drive the servo mechanism based on error signals from the alignment arrangements, thereby aligning the photodetector array with respect to the data page;
    the storage medium further comprising:
    a spinning optical disk containing data tracks and alignment tracks;
    wherein the data areas store two-dimensional arrays of data; and
    wherein the alignment tracks radially separate the data areas.

21. A system for page-based optical data storage, the system comprising:
    a storage medium;
    a servo mechanism;
    a sensor array positioned to detect a data line when the data line is optically read from the storage medium, the sensor array including a photodetector pixel array;

wherein a plurality of alignment points are defined relative to the photodetector pixel array, the sensor array further including an alignment arrangement located at each alignment point; and a servo-feedback signal generation unit operative to drive the servo mechanism based on error signals from the alignment arrangements, thereby aligning the photodetector array with respect to the data line.

22. The system of claim 21 wherein the servo-feedback signal generation unit is implemented within the same processing unit of the sensor array.

23. For use in a system for page-based optical data storage including a storage medium, a sensor array positioned to receive a data line when the data line is optically read from the storage medium, the sensor array comprising:

a photodetector pixel array for detecting the data line; and a plurality of alignment points defined relative to the photodetector pixel array, including an alignment arrangement located at each alignment point.

24. The sensor array of claim 23 further comprising:

servo-feedback signal generation logic operative to drive a servo mechanism based on error signals from the alignment arrangements, thereby aligning the photodetector array to the data line.

25. The sensor array of claim 23 wherein the alignment points are placed in the extremes along the linear pixel array.

* * * * *